Figure 1:
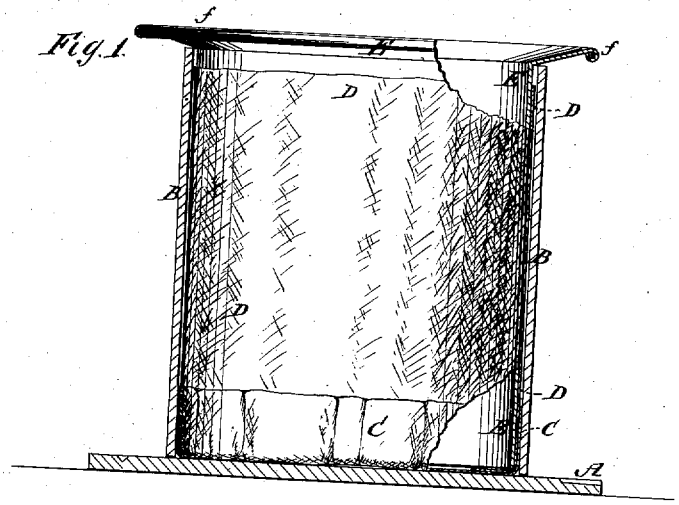

J. W. ANDREWS & N. J. OGDEN.

Manufacture of Cheese.

No. 6,117.

Reissued Nov. 3, 1874.

Witnesses:
E. Wolff
J. Fellel

Inventor:
J. W. Andrews &
N. J. Ogden.
By atty.
J. N. McGuire

UNITED STATES PATENT OFFICE.

J. W. ANDREWS AND N. J. OGDEN, OF DRYDEN, NEW YORK, ASSIGNORS, BY MESNE ASSIGNMENTS, TO JOSEPH G. HUBBELL, OF SAME PLACE.

IMPROVEMENT IN THE MANUFACTURE OF CHEESE.

Specification forming part of Letters Patent No. 88,830, dated April 13, 1869; reissue No. 6,117, dated November 3, 1874; application filed August 13, 1874.

*To all whom it may concern:*

Be it known that we, J. W. ANDREWS and N. J. OGDEN, of Dryden, in the county of Tompkins and State of New York, have invented certain new and useful Improvements in the Manufacture of Cheese; and we do hereby declare that the following is a full, clear, and exact description thereof, reference being had to the accompanying drawings and to the letters of reference marked thereon.

Previous to our invention it has been customary in the manufacture of cheese to spread the "press-cloth" upon the press-board, set the hoop on the same, fill with curd, apply the pressure necessary to express the whey and form the cheese, and, after the formation thus of the cheese, to apply the "bandage." It has also been suggested, as a substitute for this method or process of manufacture, to mold the cheese inside of the press-cloth arranged within the hoop, and leave this press-cloth on to serve as a "clothing" to the cheese.

In the first-mentioned process or method of manufacture, the curd invariably oozes out under the hoop to such an extent that there is a considerable loss, and what is not lost has to be reworked at great disadvantage; and great care is necessary and much trouble involved in the application of the bandage to the cheese. Besides these serious difficulties and objections, the bandage cannot be made to fit with that precision and closeness which are desirable.

In the last-named process or method, not only is the clothing of the cheese all over its lower side (with the cloth in which it is pressed) very objectionable, but such a clothing of the cheese, with a press-cloth folded and puckered up over the edge of the cheese, and the great expense of such cloths, render such a mode of manufacture less desirable than the first-mentioned process. The first-named process has always been practiced extensively, and, we believe, is much used now; but the last-named has never, to our knowledge, gone into practical operation.

To overcome these difficulties and, at the same time, add to the perfection of the cheese, are the main objects of our invention, which, to these ends, consists in the placement of the bandage within the hoop and the molding of the cheese within such bandage, in contradistinction to the application of the bandage to the cheese after its formation in the press; whereby not only is the great labor and trouble of putting on the bandage by hand avoided, but the cheese more thoroughly bandaged, all as will be hereinafter more fully described.

To enable those skilled in the art to which our invention appertains to make and use the same, we will now proceed to more particularly describe our improvements in the manufacture of cheese, as we have successfully practiced the same, referring, by letters of reference, to the annexed drawings, which form part of this specification, and in which—

Figure 2:
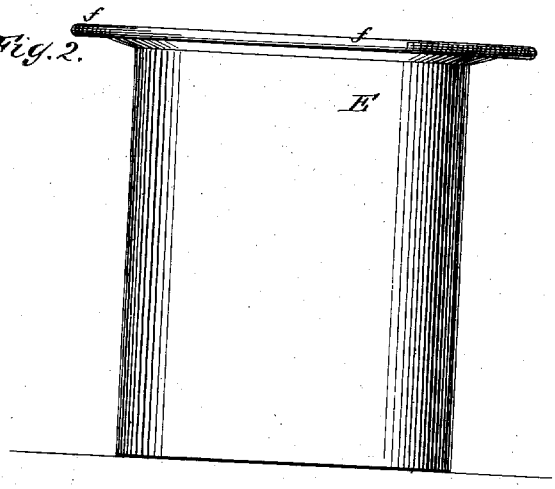
Figure 3:
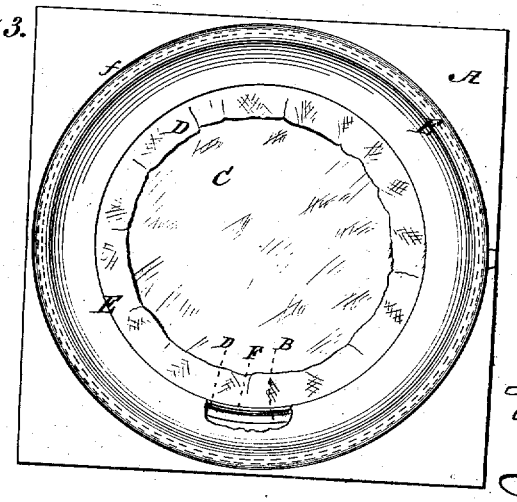

Figure 1 is a sectional side elevation of an apparatus illustrating how our invention may be practiced. Fig. 2 is a detail side view of a sheet-metal hoop which we employ to effect readily the adjustment and retention in place of the press-cloth and bandage, and facilitate the filling of the hoop with the curd; and Fig. 3 is a top view of the apparatus or contrivance adjusted for use.

In the several figures the same part will be found designated by the same letter of reference.

A represents the ordinary press-board, and B the wooden or metallic hoop usually employed in dairies and cheese-factories. C is a square cloth, called a press-cloth, and is such as is generally used. D is the bandage, made, in about the usual manner, of cloth; and E is a cylinder or hoop, made of tin or other suitable material, and provided at its upper end with a circular flange, *f*, projecting outward, as clearly shown at Figs. 1 and 2.

The operation of the devices shown may be thus explained: The bandage D is slipped over or onto the external cylindrical surface of the tin hoop E, so as to leave its lower edge projecting a little beyond the lower edge of said hoop; the press-cloth C is then spread over the top of the wooden or metallic hoop B, (the latter having been placed, as illustrated, on the press-board A,) and the tin hoop E, with its bandage D, so adjusted by hand that its lower projecting edge shall be turned in to permit the curd to rest upon it;

it is then thrust into said wooden or metallic hoop, the parts assuming the relative positions or condition shown at Figs. 1 and 3. The curd is then filled in and the hoop E withdrawn, leaving the bandage nicely in place, the press-cloth C and bandage D together forming a neat lining and bottom to the hoop B. The follower of the press is now brought to bear on the mass of curd in the hoop, as usual, care being taken to keep the upper portion of bandage D in place, and the cheese is molded or pressed into the proper size and shape.

After the formation of the cheese, the follower being withdrawn, the upwardly-projecting edge or portion of the bandage D is folded down onto the top surface of the cheese and firmly pressed in place.

The press-cloth is, of course, removed, and, after the perfect adherence of the bandage, the cheese is taken from the press and treated as usual.

It will be seen that, by placing the bandage in the hoop, filling the curd into it, and compressing or molding the cheese within the bandage in lieu of first molding the cheese and afterward applying the bandage, not only is all the inconvenience, expenditure of time and hand labor heretofore involved in putting on the bandage avoided, but the cheese will be pressed into the meshes of the cloth composing the bandage, and the latter will more closely and effectually bind the cheese than is possible by the old method or process of bandaging. The cheese will have a better rind, and be produced with greater perfection and with a great saving of time and labor over the old-fashioned process or method.

We make the hoop or cylinder E, by preference, with its flange *f* flared or funnel-shaped; but the details of construction and form of the parts of the apparatus may, of course, be varied without departing from the spirit of our invention, the gist of which rests in the molding of the cheese within the bandage, in some suitable manner placed and held within the hoop B.

Having so fully explained our invention that one skilled in the art can understand and practice it, what we claim as new in the manufacture of cheese, and desire to secure by Letters Patent, is—

Molding the cheese within the bandage-cloth, in contradistinction to applying a bandage after the formation of the cheese, substantially as and for the purposes set forth.

In testimony whereof we have hereunto set our hands and seals this 3d day of August, 1874.

J. W. ANDREWS. [L. S.]
N. J. OGDEN. [L. S.]

In presence of—
H. D. DONNELLY,
DEB. WILMOT.